United States Patent [19]

Vitulli, Jr.

[11] Patent Number: 4,535,288
[45] Date of Patent: Aug. 13, 1985

[54] METHOD AND SYSTEM FOR ROTARY SPEED DETERMINATION

[75] Inventor: Joseph L. Vitulli, Jr., New Rochelle, N.Y.

[73] Assignee: Magnetic Analysis Corporation, Mount Vernon, N.Y.

[21] Appl. No.: 399,320

[22] Filed: Jul. 19, 1982

[51] Int. Cl.³ .............................................. G01P 3/56
[52] U.S. Cl. ................................... 324/161; 324/162; 364/565
[58] Field of Search ...................... 324/161, 162, 160; 364/565

[56] References Cited

U.S. PATENT DOCUMENTS 4,323,976 4/1982 Radaelli et al. .................... 324/160
4,336,497 6/1982 Woodhouse et al. .............. 324/162

Primary Examiner—Stanley T. Krawczewicz
Attorney, Agent, or Firm—Robin, Blecker & Daley

[57] ABSTRACT

In determining shaft rpm (revolutions per minute), a transducer generates a succession of output signals, corresponding to the successive passages of a shaft indicium through the transducer field of view. Processing circuitry is provided for selecting a sequentially successive pair of transducer output signals and for computing rpm therefrom. Updated rpm is computed from a further pair of sequentially successive transducer output signals, both non-sequentially successive to the earlier selected signal pair.

13 Claims, 6 Drawing Figures

METHOD AND SYSTEM FOR ROTARY SPEED DETERMINATION

FIELD OF THE INVENTION

This invention relates to the measurement of rotational speed and pertains more particularly to the rapid determination of revolutions per minute (rpm) of rotative bodies in spatially limited environments.

BACKGROUND OF THE INVENTION

The capability of determining shaft rotational speed in quite short time periods has several evident advantages, the primary of which is the ability to quick-correct departures of shaft rotational speed from a desired datum level, e.g., within several seconds.

Such quick-correct ability can readily be obtained by providing for direct discernment of shaft speed in a short interval. Typically, one provides a speed wheel having sixty teeth and rotative with the shaft. The teeth are sensed magnetically by a transducer which yields a discrete electrical signal upon the passage of each tooth through its field of view or sensitivity. The shaft revolutions per minute (rpm) can be known in a one second interval. Thus, if five teeth are observed by the transducer in one second, an electrical counter will be stepped accordingly to a five count. A sixty multiple thereof will produce output indication of three hundred rpm.

In various situations, space limitations preclude the use of the relatively bulky sixty-tooth speed wheel. Here, one looks to a single slug mounted on the shaft and functioning as a one-tooth speed wheel. As the transducer now can provide not more than one pulse per revolution, transducer pulses are counted over an expanded time period, e.g., one minute. This practice has serious disadvantages over that first-discussed. The one-minute time period which must pass before speed can be read is too time-consuming for various applications requiring alteration of rpm for different test conditions.

Further, one cannot accurately read rpm until two update cycles following introduction of a change in motor speed. By way of example, assume a motor shaft to be rotating at one hundred and fifty rpm and that its speed is to be changed to one hundred and eighty-five rpm. As adjustment is made to the speed setter, say a rotary dial, motor speed increases as motor drive current increases. During the overall time period, i.e., preadjustment, adjustment and post-adjustment, the transducer output signals being counted occur at various motor speeds—initially at one hundred and fifty rpm, next at a speed between one hundred and fifty rpm and one hundred and eighty rpm, and ultimately at a speed approaching or somewhat exceeding one hundred and eighty rpm. After a one minute period, the counter will indicate perhaps one hundred and fifty-eight rpm. Clearly, the counter output cannot be the actual shaft speed at the time of readout, since the counter input during the minute interval preceding readout is provided in part at shaft speeds less than such actual shaft speed at readout. Another cycle is required to accurately read out actual speed, and if actual shaft speed is not precisely the desired one hundred and eighty rpm, one or more further cycles are required. Evidently, this is an intolerable situation for applications in which shaft speed is to be changed accurately and quickly.

SUMMARY OF THE INVENTION

The present invention has as its primary object the provision of method and system accomodating ready and accurate determination of rotational speed in applications involving space limitations.

It is a more particular object of the invention to enable quick-correction of shaft rotational speed in space-limited applications.

In attaining the foregoing and other objects, the invention provides method and system wherein rpm measurement is based on computation stemming from the times of occurence of a selected sequentially successive pair of output signals of a shaft transducer, with the transducer output signal succeeding the selected such pair being dismissed from consideration. The system may provide for a continuing update of rotational speed by selecting further for processing another sequentially successive pair of transducer signals non-sequential to a prior selected pair. Since each determination of rpm is made on the basis of events in but a single shaft revolution, each determination is single-speed indicative and thus has verity.

In another aspect, the system may be set to monitor rpm within a predetermined rpm range and provide output indication of out of range rpm. In a still further aspect, the system may incorporate a self-shutdown feature when rpm diminishes to a level below a given level, e.g., the system may effect self-shutdown as a motor coasts to low rpm in the course of motor turnoff.

The foregoing and other features of the invention will be further understood from the following detailed description of preferred embodiments thereof and from the drawings wherein like reference numerals identify like items throughout.

DESCRIPTION OF PREFERRED PRACTICES AND EMBODIMENTS

Figure 1:
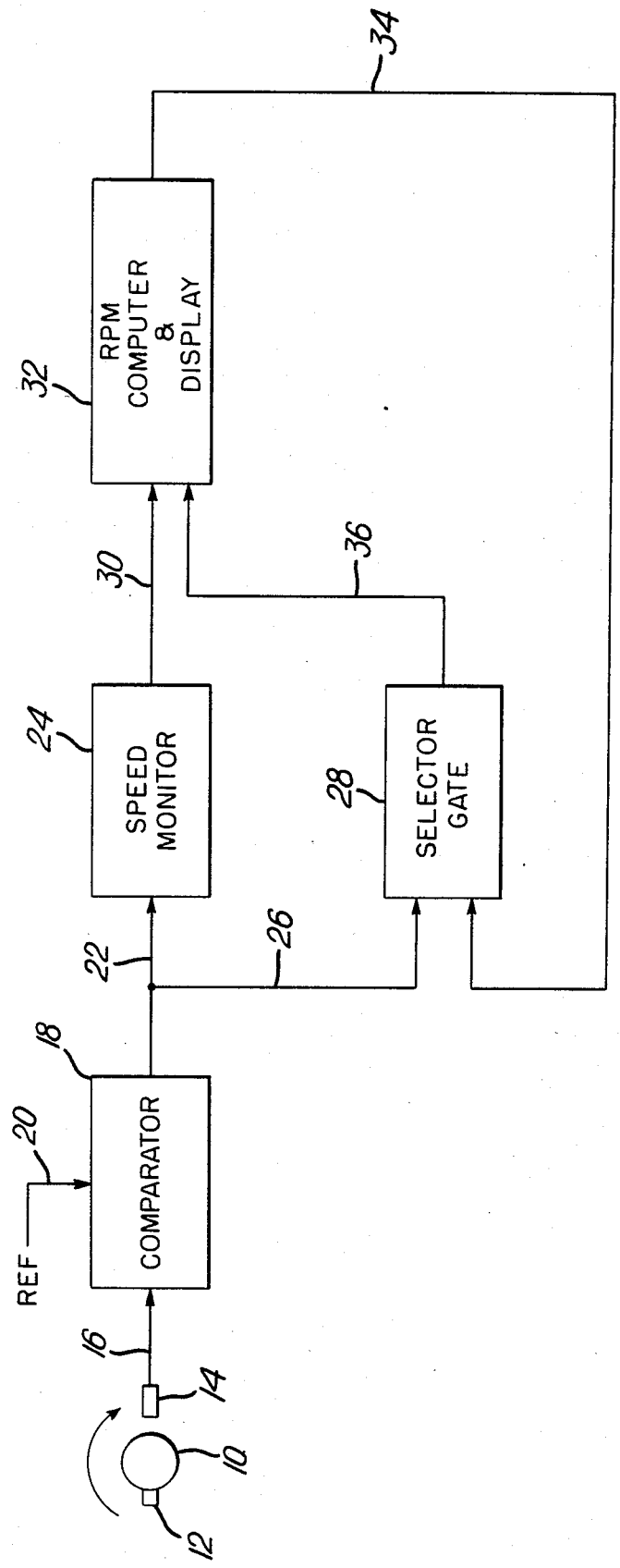
FIG. 1 is a functional block diagram of a system in accordance with the invention.

Referring to FIG. 1, shaft 10 includes at least one indicium for rotation therewith, slug indicium 12 being shown and suitably threaded onto shaft 10. A transducer 14 is disposed in fixed spatial relation to shaft 10 and positioned at a preselected location such that the field of sensitivity or view of the transducer encompasses the path of rotation of indicium 12 to generate a discrete output signal upon each passage of the indicium therethrough, thus providing a succession of signals.

The output signals of transducer 14 are conducted over line 16 to comparator 18 which is supplied with a reference datum level input (REF) over line 20. Output signals of the comparator, which correspond to the transducer output signals with enhanced signal-to-noise ratio, are applied over line 22 to speed monitor 24 and over line 26 to selector gate 28. As is discussed below in detail, speed monitor 24 is operative to provide output indication on line 30 to rpm computer and display 32 that shaft speed is or is not less than a preselected minimum. Selector gate 28 is enabled by condition of output line 34 of rpm computer and display 32 to gate pairs of sequentially successive signals applied thereto onto output line 36 and hence to unit 32.

Rpm computer and display 32 includes a counter for providing a count, at a frequency greatly in excess of the highest frequency at which the transducer can generate its output signals, selectively during the time period occurring between the signals constituting each successive pair of output signals of gate 28. Circuitry is included in unit 32 for the selection of such pairs of sequentially successive pulses and for effecting a division of the accumulated count to determine the shaft rpm. Display is then made of such determined rpm, and a further rpm measurement cycle is commenced for purposes of updating actual rpm.

Figure 2:
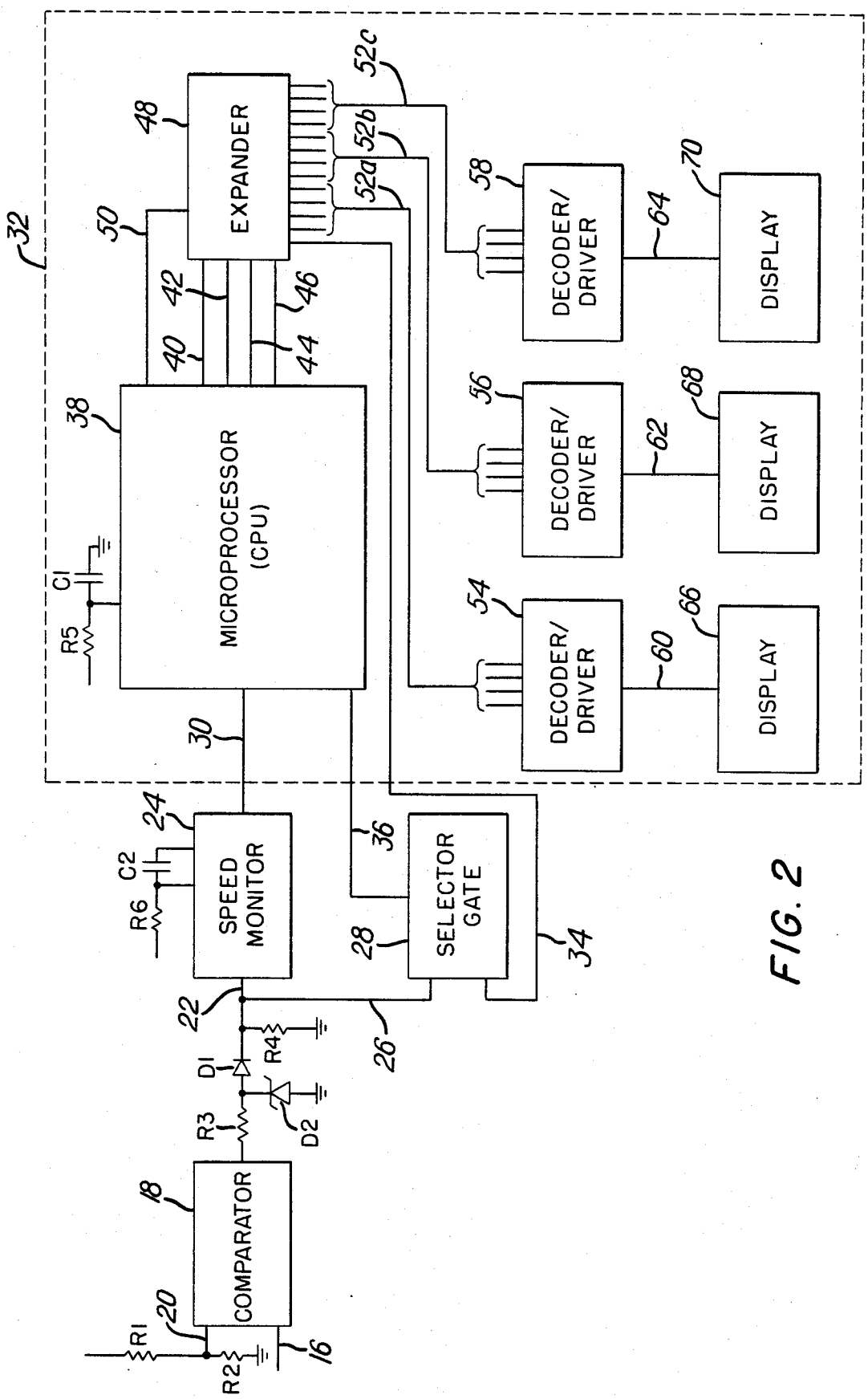
FIG. 2 is a schematic diagram of an embodiment of the FIG. 1 system.

The selection of suitable components for implementing the system of FIG. 1 will be seen by reference to the schematic diagram of FIG. 2.

Comparator 18 may be an operational amplifier of type LM741, available from National Semiconductor, line 20 deriving the REF potential from the junction of resistors R1 and R2, typically 210K and 68K, R1 being connected to +18 v. and R2 being tied to ground. Line 20 is connected to pin two of the LM741 and line 16 is connected to pin three. Pin six of the LM741 is connected to the junction of lines 22 and 26 through resistor R3 (330 ohms) andd diode D1, Zener diode D2 and resistor R4 (150 ohms) being connected as indicated to ground. Pins seven and four of the LM741 are connected to +18 v. and −18 v., respectively.

Selector gate 28 may be a pulse triggered flip-flop (F/F), of type 5472, available from Signetics, line 26 being connected to the F/F $\overline{CP}$ input (pin twelve) and line 34 being connected to the F/F $\overline{SD}$ input (pin thirteen). The Q output (pin eight) of the F/F is connected to line 36. With the $\overline{RD}$, K1, K2, K3 and Vcc pins (pins two, nine, ten, eleven and fourteen) of the F/F being connected to +5 v., and with the J1, J2, J3 and ground pins (pins three, four, five and seven) being electrically grounded, the logic of the 5472 F/F calls for the Q output (line 36) to be LO (zero volts) when line 34 is HI (+5 v.) and line 26 goes HI, i.e., applies a positive going clock pulse to the F/F $\overline{CP}$ input terminal. When line 34 thereafter goes LO, line 36 goes HI.

Rpm computer and display unit 32 includes microprocessor (CPU) 38, which may be of type 8748, available from Intel. The program implemented by CPU 38 is discussed in connection with FIG. 3 below and is set forth in machine language hereinafter. Connections are made to the 8748 unit as follows. Pins twenty-six and forty are connected to +5 v. decoupled to ground through a one-tenth microfarad capacitor. A three megahertz crystal oscillator is connected across pins two and three and the latter pin is connected to ground through a twenty-two picafarad capacitor. Pin four, the $\overline{RESET}$ or initializing input, is connected to the junction of a 10K resistor (R5) and a one microfarad capacitor (CI), the former being tied to +5 v. and the latter to ground. Line 36 is connected to pin six. Line 30 is connected to pin thirty-nine. Pins seven and twenty are grounded. Output signals are furnished on pins twenty-one through twenty-four, respectively to lines 40-46 which comprise a four-bit bus for input to expander 48.

Line 50 furnishes an output strobe to expander 48 and is connected to pin 25 of the 8748 CPU.

Expander 48 may be of type 8243, available from Intel, and functions to receive and input through a four-bit port which serves as an interface to the 8748 CPU. Thus lines 40-46 are connected to the expander pins eleven through eight. Pin seven of the expander is connected to line 50 and, as this line has a HI to LO transition, this signifies that address and control are available on lines 40-46. Three of the expander three four-bit output ports are used in FIG. 2, one being defined by pins seventeen through twenty which are connected to lines 52a, a second being defined by pins one and twenty-one through twenty-three which are connected to lines 52b, and a third being defined by pins two through five which are connected to lines 52c. Pin thirteen provides a low impedance latched output after a write operation, thereby furnishing a control signal on line 34 to selector gate 28.

Decoder/Driver units 54, 56 and 58 may be of type 5477A, available from Signetics and adapted to accept four-bit BCD data and provide seven active decoded output signals to directly drive seven-segment incandescent displays. Pins seven, one, two and six of the 5477A units are connected in respective sets to lines 52a, 52b and 52c. Lines 60, 62 and 64 connect the decoded output signals to display units 66, 68 and 70, which may be of type 5082-7751, available from Hewlett Packard.

Figure 3:
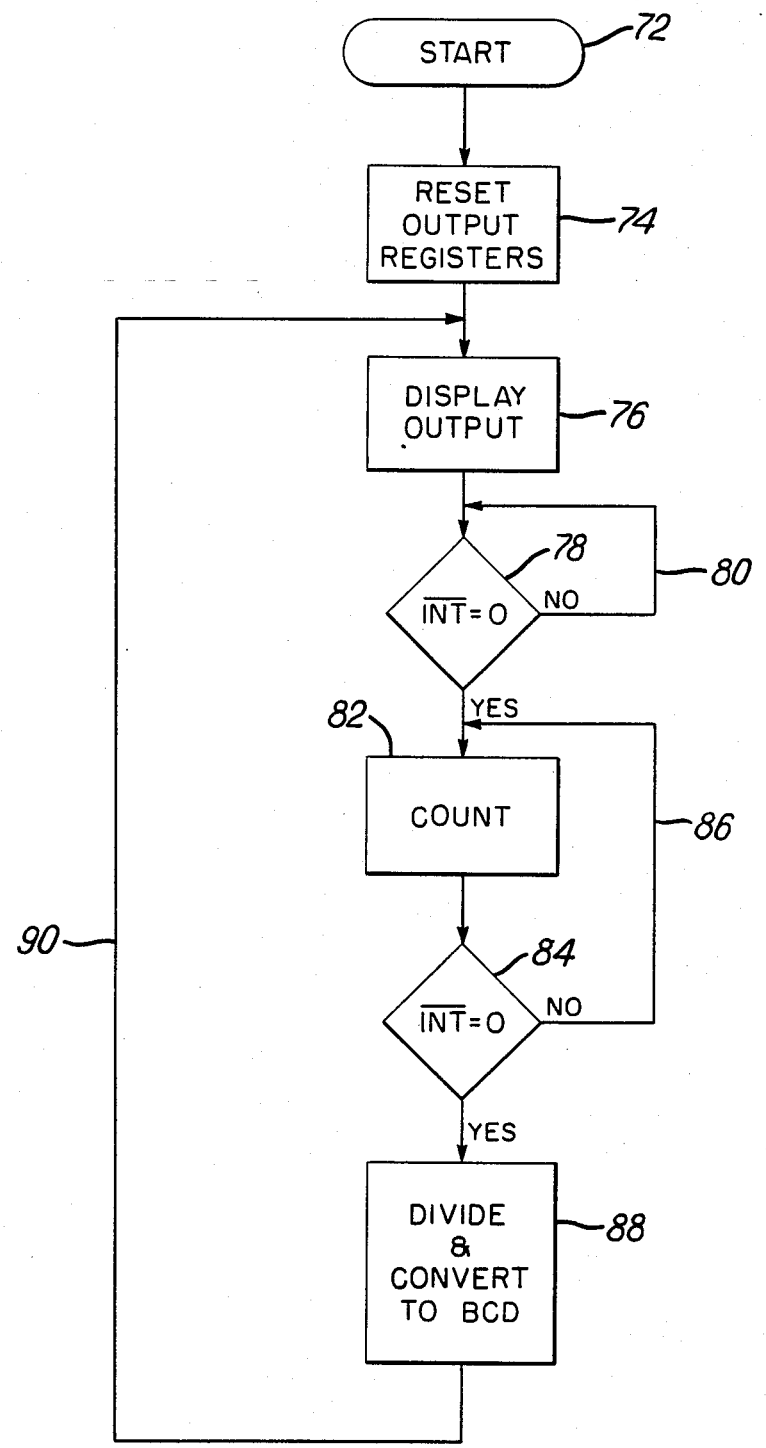
FIG. 3 is a flow chart of the program implemented in the microprocessor of FIG. 2.

In the flow chart of FIG. 3, START step 72 effects step 74 wherein the output registers of CPU 38 are reset to zero. Step 76 provides for display of the contents of the CPU 38 output registers, in this start-up case, zeroes. In step 78, inquiry is made as to the whether the $\overline{INT}$ input to CPU 38, i.e., the selector gate 28 output on line 36 is present. If not ($\overline{INT}=0$), the inquiry is repeated in step 80. If yes ($\overline{INT}\neq 0$), a counting cycle is commenced in step 82. Inquiry as to the state of line 36 is again made in step 84. If the selector gate output is nil, i.e., a full revolution of shaft 10 (FIG. 1) has not occurred and ($\overline{INT}=0$), step 86 calls for another countercycle. If $\overline{INT}\neq 0$, step 88 occurs to bring on a discontinuance of counting and a division, wherein the accumulated count is divided by a constant to determine rpm and binary to BCD conversion of the quotient is effected. Step 90 brings on an updating of the display to the calculated rpm.

Returning to FIG. 2 and the preceding discussion of the logic of selector gate 28, line 36 is active on the occurrence of each line 26 pulse during time periods in which line 34 is H1. Line 34 goes HI upon the conveyance of quotient data from CPU 38 to expander 50. The CPU 38 pin (pin six) to which selector gate 28 output) goes, is identified in the 8748 microprocessor as $\overline{INT}$. This is an interrupt input, i.e., it initiates an interrupt if interrupt is enabled. Interrupt is disabled upon reset. In the detailed program set forth below, interrupt is enabled following step 74 (FIG. 3). The $\overline{INT}$ pin is repetitively consulted per the program in steps 78 for a first selector gate output and in step 84 for the next sequentially successive selector gate output. Once such pair of sequentially successive pulses is noted in CPU 38, i.e., selected as a pulse pair for rpm determination, the CPU ignores the next succeeding selector gate output pulse or pulses to obtain uninterrupted computation time and then establishes conditions, by control of line 34, for further pulse pair selection and updating computation.

In a further aspect, the invention includes system capability for discontinuing rpm determination if rpm falls below a preselected limit, e.g., if the motor driving the shaft under observation should decelerate under a turn off or loss of power condition. For this purpose, speed monitor 24 (FIG. 2) may be a dual retriggerable monostable multivibrator of type 54LS123, available from Signetics. The self-cycle time of this unit is established by R6 and C2, typically 820K and 4.7 microfarads. The junction of R6 and C2 is connected to pin fifteen of the 54LS123. C2 is also connected to input pin fourteen and line 30 is connected to output pin thirteen. Pins three and sixteen are connected to +5 v., and pins one and eight are grounded. Line 22 is connected to pin 2.

In operation of monitor 24, as line 22 goes HI, line 30 is set to HI. If the time period established by R6 and C2 now expires without line 22 again going HI, line 30 is set to LO. Conversely, line 30 continues at HI setting if line 22 renews a HI state prior to expiration of the R6 and C2 time period.

Line 30 is connected to input pin thirty-nine of the 8748 microprocessor, a pin labeled "T1" and testable using one of the instructions (JNT1) of the instruction set of the 8748 ROM. The speed monitoring mode of operation of the system will be seen in the flow chart of FIG. 4.

Figure 4:
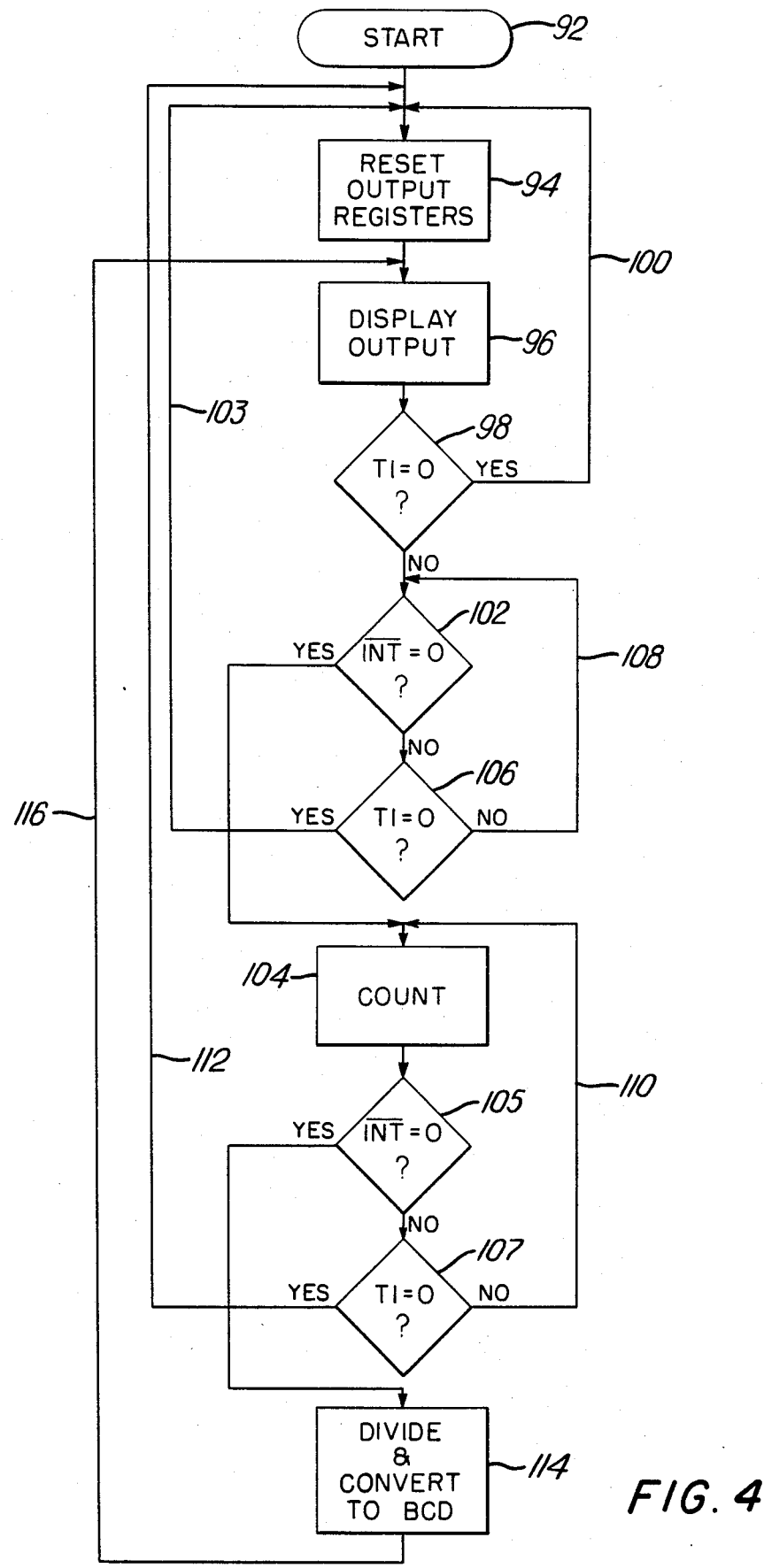
FIG. 4 is a flow chart of a further program which may be implemented in the FIG. 2 microprocessor.

Steps 92, 94 and 96 of FIG. 4 track the opening operations of FIG. 3. In step 98, inquiry is made as to the state of line 36. If it is LO, then T1=0 is answered YES and step 100 returns status to step 94. If T1 is not zero (line 30 is HI), step 102 makes inquiry of the state of the line 36 output of selector gate 28, as above discussed. If a pulse is present, count is commenced in step 104. If a pulse is not present, step 106 calls for a repeat inquiry into the state of line 30 and if T1 is not zero, a repeat inquiry is made as to the state of line 36. If T1 is zero, step 103 returns to step 94.

Assuming step 104 to have been reached, step 105 makes inquiry of line 36, looking for the next successive pulse. Where the pulse is not present, inquiry is again made as to the state of line 30 in step 107 and step 110 repeats the count cycle. If T1 is zero, step 112 returns the operation to step 94. Upon the detecting in step 105 of the next successive line 36 pulse, the operation advances to rpm determination in step 114 and to display in step 116.

Figure 5:
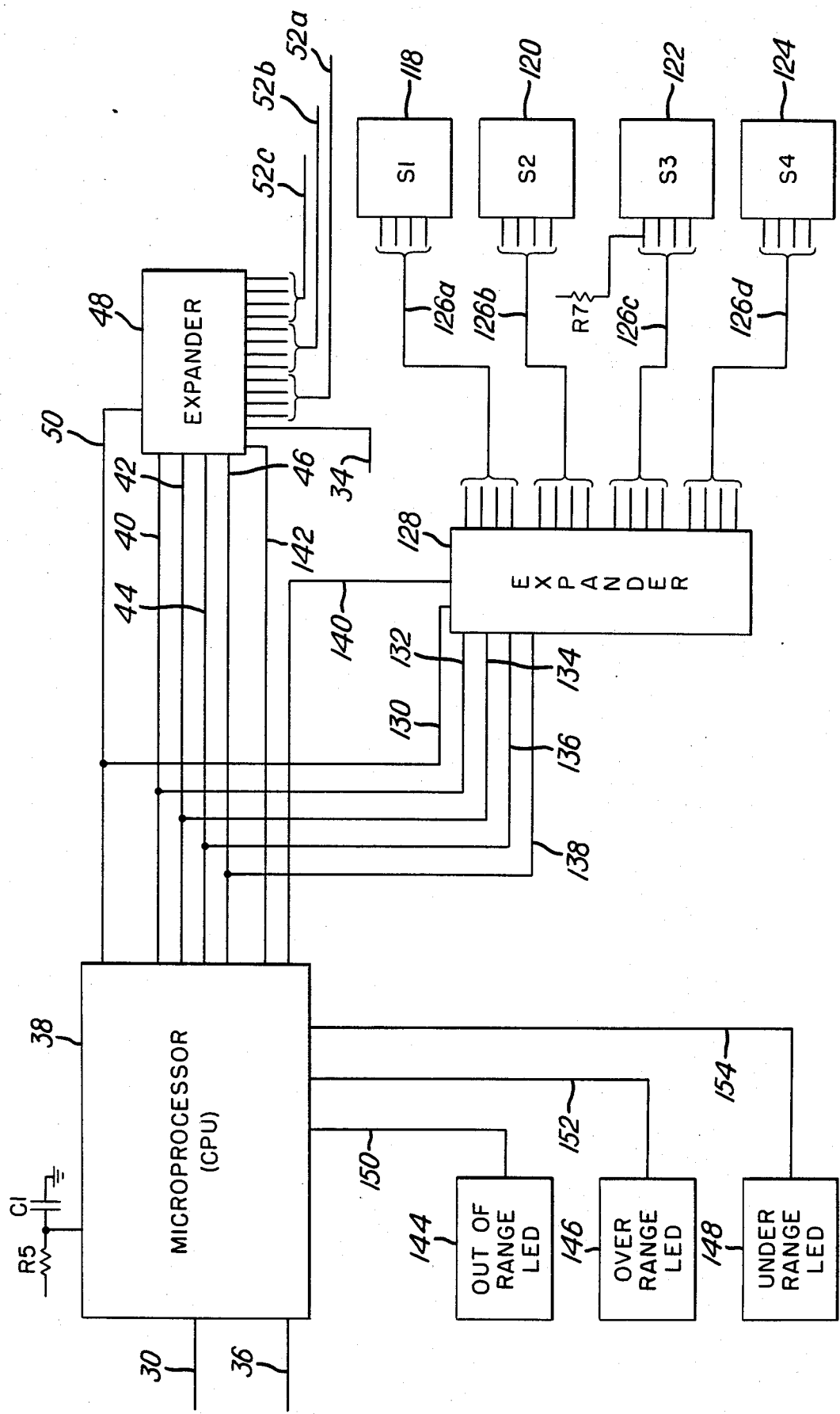
FIG. 5 is a schematic diagram of a second system in accordance with the invention.

In the embodiment shown in FIG. 5, the system of FIGS. 1 and 2 is extended to include capability for accepting input information as to a desired shaft rpm and for providing output indication of whether actual shaft rpm exceeds or is less than the desired rpm. For this purpose, thumb wheel switches S1-S4, identified by reference numerals 118 through 124, provide for output on lines 126a through 126d of from digital zero to digital 9999. As is indicated typically by resistor R7 at S3, each line is connected through a resistor to a voltage source. Expander 128, also of 8243 type above discussed, receives input from lines 126a-126d and provides a four-bit output on lines 132-138, responsive to a probe signal on line 132 and when a chip-select signal is present on line 140. Line 142 provides a chip-select signal to expander 48. CPU 38 is programmed to accept input from expander 128 by selecting expander 128 and strobing line 130 and to provide output to expander 48 by selecting expander 48 and strobing line 50, at the same set of input-output ports.

CPU 38 yields output signals to driver/comparators of range indicating light-emitting diodes (LEDS) 144, 146 and 148 over lines 150, 152 and 154. LED 144 is activated whenever actual rpm is out of range. LED 146 indicates an over range condition and LED 148 indicates an under range condition.

Figure 6:
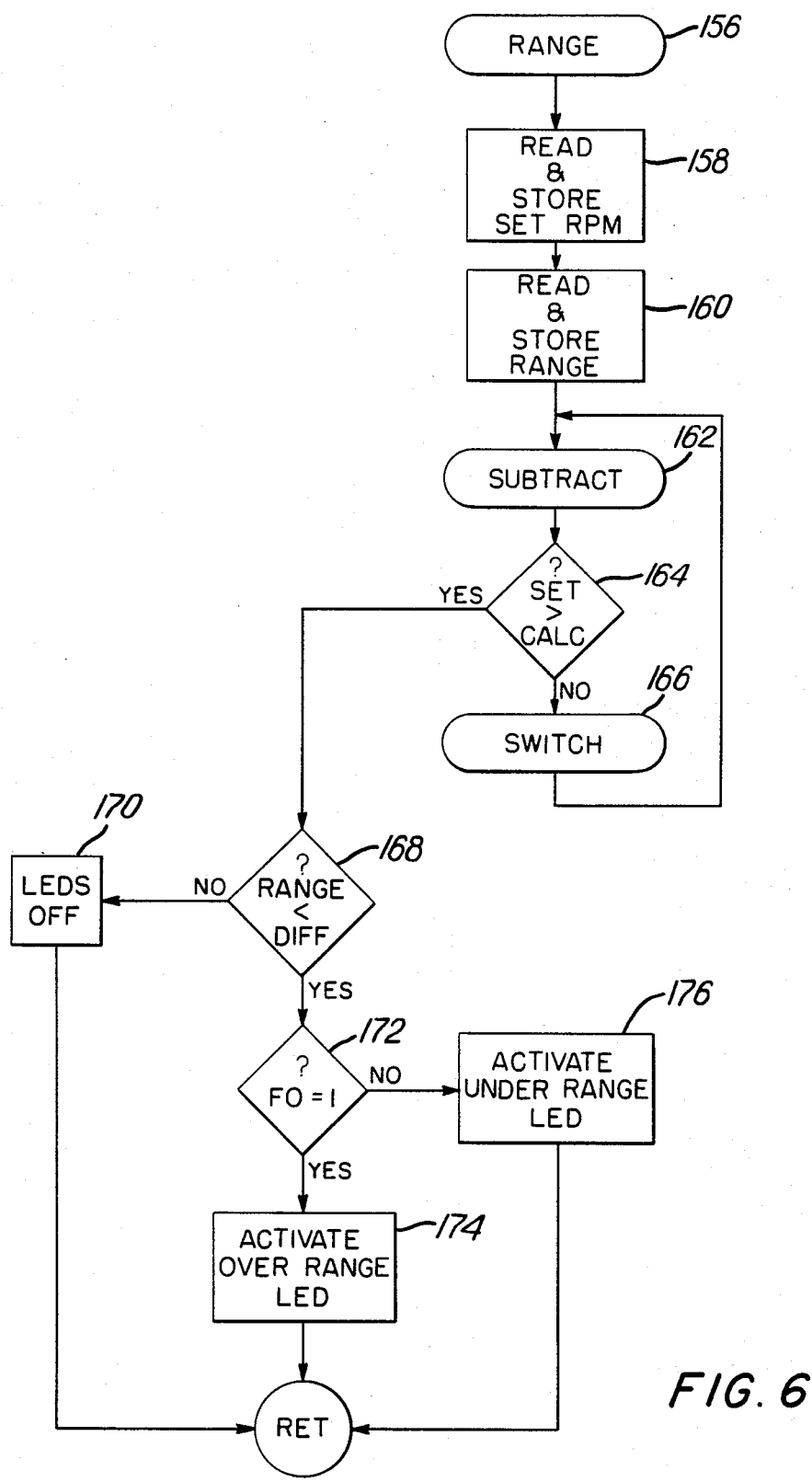
FIG. 6 is a supplemental flow chart for the FIG. 5 system.

Referring jointly to the flow charts of FIGS. 4 and 6, the range program of FIG. 6 is a subroutine occurring between steps 98 and 102 of the FIG. 4 program, i.e., following each rpm computation and preceding the succeeding rpm computation. Step 156 initiates the range subroutine and in steps 158 and 160, CPU 38 selects expander 128 and reads and stores the set rpm and allowable range. In step 162, the computed rpm is taken from storage as is the set rpm and the difference therebetween is found.

Inquiry is made in step 164 as to whether the set rpm exceeds the computed rpm. If no, step 166 provides for interchanging the storage locations of computed and set rpm and a parameter FO is set equal to one. Step 162 is now repeated and the step 164 output is necessarily yes. Step 168 makes inquiry as to whether the allowable range is less than the difference. If no, the LEDS are extinguished in step 170 and one returns (RET) to the FIG. 4 program. If yes, inquiry is made in step 172 of the state of FO. FO being one in the situation under discussion by practice of step 166 above, step 174 activates the over range LED.

If in step 164, set rpm does exceed computed rpm, the program flows as above, except that step 172 is followed (FO not being one) by step 176 and the under range LED is activated.

In typical usage of the method and system of the invention, a low speed datum level of about thirty rpm may be selected by the abovesaid values for R6 and C2. Output speed determination may extend from thirty to three hundred rpm, with system operation discontinued at speeds of less than about thirty rpm. With the three megahertz crystal operation of CPU 38, it is typical that rpm determination is made from a first and a second sequentially successive output signal selected for gating, the next succeeding transducer output being ignored (not gated), and an updated rpm determination is made from a third gated signal, which is typically sequentially successive to the ignored signal, and a fourth gated signal, which is sequentially successive to the third signal.

As will be appreciated by those skilled in the arts, various changes may be introduced in the foregoing practices and embodiments without departing from the invention. For example, more than one indicium can be employed on the shaft with the processor programmed to accomodate such change. Also, the system and method may combine variously the several aspects noted above. The preferred embodiments and practices are thus intended in an illustrative and not in a limiting sense. The true spirit and scope of the invention is set forth in the claims, which follow Tables I and II below, setting forth machine language programs respectively for the flow charts of FIGS. 4 and 6.

TABLE I

| LOC | OBJ | LINE | SOURCE STATEMENT | |
|---|---|---|---|---|
| 0000 | | 21 | ORG | 00H |
| 0000 | 0430 | 22 | JMP | BEGIN |
| | | 23 ; | | |

TABLE I-continued

| | | | | | |
|---|---|---|---|---|---|
| 0010 | | 24 | | ORG | 10H |
| 0010 | 2E | 25 | LAD1: | XCH | A,R6 |
| 0011 | 23E0 | 26 | | MOV | A, #0E0H |
| 0013 | 3A | 27 | | OUTL | P2,A; ;SELECT CONTROL CHIP |
| 0014 | 3F | 28 | | MOVD | P7,A ; SET INT =1 |
| 0015 | 27 | 29 | | CLR | A |
| 0016 | 2E | 30 | | XCH | A,R6 |
| 0017 | 2400 | 31 | | JMP | LADJ ; LEFT JUSTIFY DIVISOR |
| | | 32; | | | |
| 0030 | | 33 | | ORG | 30H |
| 0030 | 2301 | 34 | BEGIN: | MOV | A,#01H |
| 0032 | 39 | 35 | | OUTL | P1,A ; TURN ON LOW LED |
| 0033 | B830 | 36 | | MOV | R0,#30H ;R0 POINTS TO A DATA MEMORY LOCATION |
| 0035 | BC0F | 37 | | MOV | R4,#0FH |
| | | 38 | | | |
| 0037 | B000 | 39 | TURNON: | MOV | @R0,#00H |
| 0039 | 18 | 40 | | INC | R0 |
| 003A | EC37 | 41 | | DJNZ | R4,TURNON ; CLEAR DATA MEMORY LOCATIONS |
| 003C | BD00 | 42 | | MOV | R5,#00H |
| 003E | BE00 | 43 | | MOV | R6,#00H |
| 0040 | 23E0 | 44 | | MOV | A,#0E0H |
| 0042 | 3A | 45 | | OUTL | P2,A;SELECT CONTROL CHIP |
| 0043 | 3F | 46 | | MOVD | P7,A ;SET INT −1 |
| | | 47 ; | | | |
| 0044 | 97 | 48 | OUTPUT: | CLR | C |
| 0045 | 85 | 49 | | CLR | F0 |
| 0046 | A5 | 50 | | CLR | F1 |
| 0047 | B900 | 51 | | MOV | R1,#00H |
| 0049 | BA00 | 52 | | MOV | R2,300H |
| 004B | BE00 | 53 | | MOV | R6,300H |
| 004D | 5400 | 54 | | CALL | DISPL ; DISPLAY CALCULATED RPM |
| 004F | 4630 | 55 | | JNT1 | BEGIN ; IF MOTOR OFF, IGNORE RANGE |
| 0051 | 5420 | 56 | | CALL | RANGE ; COMPARE CALCULATED RPM TO SET RPM |
| 0053 | 23E1 | 57 | | MOV | A,#0E1H |
| 0055 | 3A | 58 | | OUTL | P2,A ; SELECT CONTROL CHIP |
| 0056 | 3F | 59 | | MOVD | P7,A ; ENABLE INT |
| 0057 | 27 | 60 | | CLR | A |
| | | 61 ; | | | |
| 0058 | 8670 | 62 | WAIT: | JN1 | COUNT1 ; STAY HERE TILL FIRST SYNCH PULSE |
| 005A | 4630 | 63 | | JNT1 | BEGIN ; IF T1 IS LOW, THEN MOTOR IS OFF |
| 005C | 0458 | 64 | | JMP | WAIT |
| | | 65 ; | | | |
| 0070 | | 66 | | ORG | 70H |
| 0070 | 27 | 67 | COUNT1: | CLR | A |
| 0071 | 3F | 68 | | MOVD | P7,A ; SET INT |
| 0072 | 17 | 69 | | INC | A |
| 0073 | 3F | 70 | | MOVD | P7,A ; ENABLE INT |
| 0074 | 27 | 71 | | CLR | A |
| | | 72 ; | | | |
| 0075 | BB20 | 73 | COUNT2: | MOV | R3,#20H |
| | | 74 ; | | | |
| 0077 | 8610 | 75 | COUNT3: | JNI | LAD1; TIME DELAY, 665 MSEC |
| 0079 | EB77 | 76 | | DJNZ | R3, COUNT3 |
| 007B | 0301 | 77 | | ADD | A,#01H;COUNT PERIOD OF REVOLUTION |
| 007D | E675 | 78 | | JNC | COUNT2 |
| 007F | 97 | 79 | | CLR | C |
| 0080 | 1A | 80 | | INC | R2 ; R2 IS MSB OF |

TABLE I-continued

| | | | | | |
|---|---|---|---|---|---|
| 0081 | 4630 | 81 | | JNT1 | DIVISOR BEGIN;IF T1 IS LOW, THEN MOTOR IS OFF |
| 0083 | 0475 | 82 | | JMP | COUNT 2 |
| | | 83 ; | | | |
| | | 84 | | | |
| ;********************************************** | | | | | |
| | | 85 ; | | | |
| | | 86 ; | | | |
| | | 87 ; | THIS ROUTINE LEFT JUSTIFIES THE DIVISOR IN | | |
| | | 88 ; | PREPARATION FOR THE DIVISION ROUTINE | | |
| | | 89 ; | | | |
| | | 90 ; | | | |
| 0100 | | 91 | | ORG | 100H |
| 0100 | 29 | 92 | LADJ: | XCH | A,R1 ; PREPARE FOR DIVISION |
| 0101 | B801 | 93 | | MOV | R0,#01H; R1 IS LSB OF DIVISOR |
| 0103 | BE00 | 94 | | MOV | R6,#00H ; R6 IS LSB OF QUOTIENT |
| 0105 | BF00 | 95 | | MOV | R7,#00H ; IS MSB OF QUOTIENT |
| 0107 | BCC8 | 96 | | MOV | R4,#0C8H ; R4 IS LSB OF DIVIDEND |
| 0109 | BDAF | 97 | | MOV | R,5#0AFH ; R5 IS MSB OF DIVIDEND |
| | | 98 ; | | | |
| 010B | 18 | 99 | SHIFT: | INC | R0 ; LEFT ADJUST THE DIVISOR |
| 010C | F8 | 100 | | MOV | A,R0 ; R0 IS THE SHIFT COUNTER |
| 010D | 03EF | 101 | | ADD | A,#0EFH |
| 010F | F6A0 | 102 | | KC | TERR ; CARRY IS AN ERROR |
| 0111 | 0311 | 103 | | ADD | A,#11H |
| 0113 | 97 | 104 | | CLR | C |
| 0114 | A8 | 105 | | MOV | R0,A |
| 0115 | FA | 106 | | MOV | A,R2 |
| 0116 | F225 | 107 | | JB7 | DIV ; WHEN B7=1 DIVISOR IS LEFT JUSTIFIED |
| 0118 | F7 | 108 | | RLC | A |
| 0119 | AA | 109 | | MOV | R2,A |
| 011A | F9 | 110 | | MOV | A,R1 |
| 011B | F7 | 111 | | RLC | A |
| 011C | F621 | 112 | | JC | INCC; THIS CARRIES TO MSB OF QUOTIENT |
| | | 113 ; | | | |
| 011E | A9 | 114 | AR1: | MOV | R1,A |
| 011F | 240B | 115 | | JMP | SHIFT |
| | | 116 ; | | | |
| 0121 | 1A | 117 | INCC: | INC | R2 |
| 0122 | 97 | 118 | | CLR | C |
| 0123 | 241E | 119 | | JMP | AR1 |
| | | 120 ; | | | |
| | | 121 | | | |
| ;********************************************** | | | | | |
| | | 122 ; | | | |
| | | 123 ; | | | |
| | | 124 ; | THE DIVISION ROUTINE: | | |
| | | 125 ; | | | |
| | | 126 ; | | | |
| 0125 | FD | 127 | DIV: | MOV | A,R5 |
| 0126 | 37 | 128 | | CPL | A |
| 0127 | 6A | 129 | | ADD | A,R2 |
| 0128 | 37 | 130 | | CPL | A |
| 0129 | 7658 | 131 | | JF1 | CARRY |
| | | 132 ; | | | |
| 012B | E632 | 133 | R: | JNC | GTT |
| 012D | 97 | 134 | | CLR | C |
| 012E | 85 | 135 | | CLR | F0 |
| 012F | 95 | 136 | | CPL | F0 |
| 0130 | 243C | 137 | | JMP | ANS |
| | | 138 ; | | | |
| 0132 | AD | 139 | GTT: | MOV | R5,A |
| 0133 | FC | 140 | | MOV | A,R4 |
| 0134 | 37 | 141 | | CPL | A |
| 0135 | 69 | 142 | | ADD | A,R1 |
| 0136 | 37 | 143 | | CPL | A |
| 0137 | E63B | 144 | | JNC | OK |

TABLE I-continued

| | | | | |
|---|---|---|---|---|
| 0139 | 97 | 145 | CLR | C |
| 013A | CD | 146 | DEC | R5 |
| | | 147 ; | | |
| 013B | AC | 148 | OK: MOV | R4,A |
| | | 149 ; | | |
| 013C | FE | 150 | ANS: MOV | A,R6 |
| 013D | F7 | 151 | RLC | A |
| 013E | AE | 152 | MOV | R6,A |
| 013F | FF | 153 | MOV | A,R7 |
| 0140 | F7 | 154 | RLC | A |
| 0141 | F6A6 | 155 | JC | TBEG |
| 0143 | B646 | 156 | JF0 | Q |
| 0145 | 1E | 157 | INC | R6 |
| | | 158 ; | | |
| 0146 | AF | 159 | Q: MOV | R7,A |
| 0147 | 85 | 160 | CLR | F0 |
| 0148 | C8 | 161 | DEC | R0 |
| 0149 | F8 | 162 | MOV | A,R0 |
| 014A | C65C | 163 | JZ | DVDEND |
| 014C | FC | 164 | MOV | A,R4 |
| 014D | F7 | 165 | RLC | A |
| 014E | AC | 166 | MOV | R4,A |
| 014F | FD | 167 | MOV | A,R5 |
| 0150 | F7 | 168 | RLC | A |
| 0151 | AD | 169 | MOV | R5,A |
| 0152 | E625 | 170 | JNC | DIV |
| 0154 | A5 | 171 | CLR | F1 |
| 0155 | B5 | 172 | CPL | F1 |
| 0156 | 2425 | 173 | JMP | DIV |
| | | 174 ; | | |
| 0158 | 97 | 175 | CARRY: CLR | C |
| 0159 | A5 | 176 | CLR | F1 |
| 015A | 242B | 177 | JMP | R |
| | | 178 ; | | |
| 015C | B830 | 179 | DIVIDEND: MOV | R0,#30H ; SET REGISTERS TO PERMIT BCD CONV. |
| 015E | FE | 180 | MOV | A,R6 |
| 015F | 28 | 181 | XCH | A,R0 |
| 0160 | A9 | 182 | MOV | R1,A |
| 0161 | 28 | 183 | XCH | A,R0 |
| 0162 | BC03 | 184 | MOV | R4,#03H |
| | | 185 ; | | |
| 0164 | B100 | 186 | BCDCOA: MOV | @R1,#00H; BINARY TO BCD CONVERSION |
| 0166 | 19 | 187 | INC | R1 |
| 0167 | EC64 | 188 | DJNZ | R4,BCDCOA |
| 0169 | BB10 | 189 | MOV | R3,10H |
| | | 190 ; | | |
| 016B | 97 | 191 | BCDCOB: CLR | C |
| 016C | F7 | 192 | RLC | A |
| 016D | 2F | 193 | XCH | A,R7 |
| 016E | F7 | 194 | RLC | A |
| 016F | 2F | 195 | XCH | A,R7 |
| 0170 | 28 | 196 | XCH | A,R0 |
| 0171 | A9 | 197 | MOV | R1,A |
| 0172 | 28 | 198 | XCH | A,R0 |
| 0173 | BC03 | 199 | MOV | R4,#03H |
| 0175 | AD | 200 | MOV | R5,A |
| | | 201 ; | | |
| 0176 | F1 | 202 | BCDCOC: MOV | A,@R1 |
| 0177 | 71 | 203 | ADDC | A,@R1 |
| 0178 | 57 | 204 | DA | A |
| 0179 | A1 | 205 | MOV | @R1,A |
| 017A | 19 | 206 | INC | R1 |
| 017B | EC76 | 207 | DJNZ | R4,BCDCOC |
| 017D | FD | 208 | MOV | A,R5 |
| 017E | F6A6 | 209 | JC | TBEG |
| 0180 | EB6B | 210 | DJNZ | R3,BCDCOB |
| 0182 | 97 | 211 | CLR | C |
| | | 212 ; | | |
| 0183 | F0 | 213 | TANS: MOV | A,@R0 ; TAKE BCD ANS AND PUT IN OUTPUT REGS |
| 0184 | 2C | 214 | XCH | A,R4 ; R4 IS TWO LS DIGITS OF ANSWER |
| 0185 | 18 | 215 | INC | R0 |
| 0186 | F0 | 216 | MOV | A,@R0 |
| 0187 | 2D | 217 | XCH | A,R5 ; R5 IS MS OF ANSWER |
| 0188 | 0444 | 218 | JMP | OUTPUT |
| | | 219 | | |

TABLE I-continued

| | | | | |
|---|---|---|---|---|
| 01A0 | | 220 | ORG | 1A0H |
| 01A0 | B830 | 221 TERR: | MOV | R0,#30H ; DATA MEM 30H IS MS DIGITS |
| 01A2 | 2483 | 222 | JMP | TANS ; DATA MEM 32H IS LS DIGITS |
| | | 223 ; | | |
| 01A6 | | 224 | ORG | 1A6H |
| 01A6 | 0444 | 225 TBEG: | JMP | OUTPUT |
| | | 226 ; | | |
| | | 227 | | |

;***********************************************

| | | | | |
|---|---|---|---|---|
| | | 228 ; | | |
| | | 229 ; | | |
| | | 230 ; | THE FOLLOWING SUBROUTINES ARE USED BY THE MAIN PROGRAM | |
| | | 231 ; | | |
| | | 232 ; | | |
| 0200 | | 233 | ORG | 200H |
| 0200 | FC | 234 DISPL: | MOV | A,R4 ; SUBROUTINE TO DISPLAY ANSWER |
| 0201 | 3E | 235 | MOVD | P6,A; DISPLAY UNITS |
| 0202 | 47 | 236 | SWAP | A |
| 0203 | 3D | 237 | MOVD | P5,A; DISPLAY TENS |
| 0204 | FD | 238 | MOV | A,R5 |
| 0205 | 3C | 239 | MOVD | P4,A; DISPLAY HUNDREDS |
| 0206 | 83 | 240 | RET | |
| | | 241 ; | | |
| 0220 | | 242 | ORG | 220H; SUBROUTINE TO CHECK THE RANGE |
| 0220 | B830 | 243 RANGE: | MOV | R0,#30H ; LOWER BYTE IS ALWAYS LSD |
| 0222 | B932 | 244 | MOV | R1,#32H ; PUT CALC RPM IN DATA MEM 32H & 33H |
| 0224 | F0 | 245 | MOV | A,@R0 |
| 0225 | A1 | 246 | MOV | @R1,A |
| 0226 | 18 | 247 | INC | R0 |
| 0227 | 19 | 248 | INC | R1 |
| 0228 | F0 | 249 | MOV | A,@R0 |
| 0229 | A1 | 250 | MOV | @R1,A |
| 022A | B834 | 251 | MOV | R0,#34H |
| 022C | 23D0 | 252 | MOV | A,#0D0H |
| 022E | 3A | 253 | OUTL | P2,A ; SELECT INPUT CHIP |
| 022F | 0C | 254 | MOVD | A,P4 |
| 0230 | 0C | 255 | MOVD | A,PA ; INPUT LS DIGIT |
| 0231 | A0 | 256 | MOVD | @R0,A |
| 0232 | 0D | 257 | MOVD | A,P5 |
| 0233 | 0D | 258 | MOVD | A,P5 ; INPUT MIDDLE DIGIT |
| 0234 | 47 | 259 | SWAP | A |
| 0235 | 40 | 260 | ORL | A,@R0 |
| 0236 | 37 | 261 | CPL | A ; UNDO CPL LOGIC OF SWITCH |
| 0237 | A0 | 262 | MOV | @R0,A ; DATA MEMORY 34H IS TWO LOWER DIGITS |
| 0238 | 18 | 263 | INC | R0 |
| 0239 | 0E | 264 | MOVD | A,P6 |
| 023A | 0E | 265 | MOVD | A,P6 ; INPUT MS DIGIT |
| 023B | 37 | 266 | CPL | A |
| 023C | 530F | 267 | ANL | A,#0FH ; UNDO CPL LOGIC OF SWITCH |
| 023E | A0 | 268 | MOV | @R0,A ; DATA MEMORY 35H IS MS DIGIT |
| 023F | B838 | 269 | MOV | R0,#38H |
| 0241 | 0F | 270 | MOVD | A,P7 |
| 0242 | 0F | 271 | MOVD | A,P7 ; INPUT RANGE VALUE |
| 0243 | 37 | 272 | CPL | A |
| 0244 | 530F | 273 | ANL | A,#0FH ; UNDO CPL LOGIC OF SWITCH |
| 0246 | A0 | 274 | MOV | @R0,A ; DATA MEMORY 38H & 39H IS RANGE |
| 0247 | 18 | 275 | INC | R0 |
| 0248 | 27 | 276 | CLR | A |

TABLE I-continued

| | | | | | |
|---|---|---|---|---|---|
| 0249 | A0 | 277 | | MOV | @R0,A ; CLEAR DATA MEMORY 39H |
| | | 278 ; | | | |
| 024A | B832 | 279 | RANGE1: | MOV | R0,#32H ; R0 POINTS TO SUBTRAHEND |
| 024C | B936 | 280 | | MOV | R1,#36H; R1 POINTS TO DIFFERENCE |
| 024E | 5470 | 281 | | CALL | SUBTR |
| 0250 | F656 | 282 | | JC | RANGE 2 ; C=1 IF SET>ACTUAL RPM |
| 0252 | 5490 | 283 | | CALL | SWITCH |
| 0254 | 444A | 284 | | JMP | RANGE1 |
| | | 285 ; | | | |
| 0256 | 97 | 286 | RANGE2: | CLR | C |
| 0257 | B836 | 287 | | MOV | R0,#36H |
| 0259 | B93A | 288 | | MOV | R1,#3AH |
| 025B | 5470 | 289 | | CALL | SUBTR |
| 025D | 2304 | 290 | | MOV | A,#04H |
| 025F | F669 | 291 | | JC | RANGE3 ; C=1 IF RANGE>DIFFERENCE |
| 0261 | B667 | 292 | | JF0 | OVRANG |
| | | 293 ; | | | |
| 0263 | 2301 | 294 | UNRANG: | MOV | A,#01H ; BIT 0 IS UNDER RANGE LED |
| 0265 | 4469 | 295 | | JMP | RANGE3 ; BIT 2 IS TO P.C. |
| | | 296 ; | | | |
| 0267 | 2302 | 297 | OVERANG: | MOV | A,#02 ; BIT 1 IS OVER RANGE LED |
| | | 298 ; | | | ; BIT 2 IS TO P.C. |
| | | 299 ; | | | |
| 0269 | 85 | 300 | RANGE3: | CLR | F0 |
| 026A | 97 | 301 | | CLR | C |
| 026B | 39 | 302 | | OUTL | P1,A ; ACTIVATE PROPER LINES |
| 026C | 83 | 303 | | RET | |
| | | 304 ; | | | |
| 0270 | | 305 | | ORG | 270H |
| 0270 | 97 | 306 | SUBTR: | CLR | C ; SUBTRACTION OF BCD NUMBERS |
| 0271 | F0 | 307 | | MOV | A,@R0 |
| 0272 | 18 | 308 | | INC | R0 |
| 0273 | 18 | 309 | | INC | R0 ; R0 POINTS TO SET RPM |
| 0274 | 37 | 310 | | CPL | A |
| 0275 | 039A | 311 | | ADD | A,#9AH |
| 0277 | 70 | 312 | | ADDC | A,@R0 |
| 0278 | C8 | 313 | | DEC | R0 |
| 0279 | 57 | 314 | | DA | A |
| 027A | A1 | 315 | | MOV | @R1,A ; TWO LS DIGITS OF DIFFERENCE |
| 027B | 19 | 316 | | INC | R1 |
| 027C | F0 | 317 | | MOV | A,@R0 |
| 027D | 18 | 318 | | INC | R0 |
| 027E | 18 | 319 | | INC | R0 |
| 027F | 37 | 320 | | CPL | A |
| 0280 | 1399 | 321 | | ADDC | A,#99H |
| 0282 | 70 | 322 | | ADDC | A,@R0 |
| 0283 | 57 | 323 | | DA | A |
| 0284 | A1 | 324 | | MOV | @RA,A ; MS DIGIT IS DIFFERENCE |
| 0285 | 83 | 325 | | RET | |
| | | 326; | | | |
| 0290 | | 327 | | ORG | 290H ; SWITCH CALC & SET RPM TO GET POS ANS |
| 0290 | BA02 | 328 | SWITCH: | MOV | R2,#02H ; R2 IS JUST A COUNTER |
| 0292 | B934 | 329 | | MOV | R1,334H |
| 0294 | B832 | 330 | | MOV | R0,#32H |
| | | 331 ; | | | |
| 0296 | F0 | 332 | SWITC1: | MOV | A,@R0 |
| 0297 | 21 | 333 | | XCH | A,@R1 |
| 0298 | A0 | 334 | | MOV | @R0,A |
| 0299 | 18 | 335 | | INC | R0 |
| 029A | 19 | 336 | | INC | R1 |
| 029B | EA96 | 337 | | DJNZ | R2,SWITC1 |
| 029D | 85 | 338 | | CLR | F0 |
| 0293 | 95 | 339 | | CPL | F0 |
| 029F | 83 | 340 | | RET | |

TABLE I-continued

```
         341 ;
         342                END
USER SYMBOLS
ANS     013C   AR1     011E   BCDCOA OL64    BCDCOB 016B
COUNT2  0075   COUNT3  0077   DISPL 0200     DIV 0125
LADJ    0100   OK      013B   OUTPUT 0044    OVRANG 0267
RANGE2  0256   RANGE3  0269   SHIFT 01OB     SUBTR 0270
TERR    01A0   TURNON  0037   UNRANG 0263    WAIT 0058
BCDCOC  0176   BEGIN   0030   CARRY 0158     COUNT1 0070
DVDEND  015C   GTT     0132   INCC 0121      LAD1 0010
Q       0146   R       012B   RANGE 0220     RANGE1 024A
SWITC1  0296   SWITCH  0290   TANS 0183      TBEG 01A6
```

TABLE II

| LOC | OBJ | LINE | | SOURCE STATEMENT | |
|---|---|---|---|---|---|
| 0000 | | 1 | | ORG | 00H |
| 0000 | 0430 | 2 | | JMP | BEGIN |
| | | 3 ; | | | |
| 0010 | | 4 | | ORG | 10H |
| 0010 | 2E | 5 | LAD1: | XCH | A,R6 |
| 0011 | 27 | 6 | | CLR | A ; SET INT |
| 0012 | 3F | 7 | | MOVD | P7,A |
| 0013 | 2E | 8. | | XCH | A,R6 |
| 0014 | 2400 | 9 | | JMP | LADJ |
| | | 10 ; | | | |
| 0030 | | 11 | | ORG | 30H |
| 0030 | B830 | 12 | BEGIN: | MOV | R,#30H ; CLEAR OUTPUT MEMORY LOCATIONS |
| 0032 | BC03 | 13 | | MOV | R4,#03H |
| 0034 | B000 | 14 | TURNON: | MOV | @R0,#00H |
| 0036 | 18 | 15 | | INC | R0 |
| 0037 | EC34 | 16 | | DJNZ | R4,TURNON |
| 0039 | BD00 | 17 | | MOV | R5,#00H |
| 003B | BE00 | 18 | | MOV | R6,#00H |
| 003D | 27 | 19 | | CLR | A ; SET INT |
| 003E | 3F | 20 | | MOVD | P7,A |
| | | 21 ; | | | |
| 003F | 97 | 22 | OUTPUT: | CLR | C |
| 0040 | 85 | 23 | | CLR | F0 |
| 0041 | A5 | 24 | | CLR | F1 |
| 0042 | B900 | 25 | | MOV | R1,#00H |
| 0044 | BA00 | 26 | | MOV | R2,#00H |
| 0046 | BE00 | 27 | | MOV | R6,#00H |
| 0048 | 5400 | 28 | | CALL | DISPL |
| 004A | 5410 | 29 | | CALL | DISEC |
| 004C | 2301 | 30 | | MOV | A,#01H ; ENABLE INT |
| 004E | 3F | 31 | | MOVD | P7,A |
| 004F | 27 | 32 | | CLR | A |
| | | 33 ; | | | |
| 0050 | 8670 | 34 | WAIT: | JNI | COUNT1 ; STAY HERE TILL FIRST SYNCH PULSE |
| 0052 | 4630 | 35 | | JNT1 | BEGIN ; IF T1 IS LOW, THEN MOTOR IS OFF |
| 0054 | 0450 | 36 | | JMP | WAIT |
| | | 37 ; | | | |
| 0070 | | 38 | | ORG | 70H |
| 0070 | 27 | 39 | COUNT1: | CLR | A ; SET INT |
| 0071 | 3F | 40 | | MOVD | P7,A |
| 0072 | 17 | 41 | | INC | A ; ENABLE INT |
| 0073 | 3F | 42 | | MOVD | P7,A |
| 0074 | 27 | 43 | | CLR | A |
| | | 44 ; | | | |
| 0075 | BB20 | 45 | COUNT2: | MOV | R3,#20H |
| | | 46 ; | | | |
| 0077 | 8610 | 47 | COUNT3: | JNI | LAD1 ; TIME DELAY, 665 MSEC |
| 0079 | EB77 | 48 | | DJNZ | R3,COUNT 3 |
| 007B | 0301 | 49 | | ADD | A #01H ; COUNT PERIOD OF REVOLUTION |
| 007D | F675 | 50 | | JNC | COUNT 2 |
| 007F | 97 | 51 | | CLR | C |
| 0080 | 1A | 52 | | INC | R2 ; R2 IS MSB OF DIVISOR |
| 0081 | 4630 | 53 | | JNT1 | BEGIN ; IF T1 IS LOW, THEN MOTOR IS OFF |

TABLE II-continued

| | | | | | |
|---|---|---|---|---|---|
| 0083 | 0475 | 54 | | JMP | COUNT 2 |
| | | 55 ; | | | |
| 0100 | | 56 | | ORG | 100H |
| 0100 | 29 | 57 | LADJ: | XCH | A,R1 ; PREPARE FOR DIVISION |
| 0101 | B801 | 58 | | MOV | R0,#01H ; R1 IS LSB OF DIVISOR |
| 0103 | BE00 | 59 | | MOV | R6,#01H ; R6 IS LSB OF QUOTIENT |
| 0105 | BF00 | 60 | | MOV | R7,#00H ; R7 IS MSB OF QUOTIENT |
| 0107 | BCC8 | 61 | | MOV | R4,#0C8H ; R4 IS LSB OF DIVIDEND |
| 0109 | BDAF | 62 | | MOV | R5,#0AFH ; R5 IS MSB OF DIVIDEND |
| | | 63 ; | | | |
| 010B | 18 | 64 | SHIFT: | INC | R0; LEFT ADJUST THE DIVISOR |
| 010C | F8 | 65 | | MOV | A,R0 ; R0 IS THE SHIFT COUNTER |
| 010D | 03EF | 66 | | ADD | A,#0EFH |
| 010F | F6A0 | 67 | | JC | TERR ; CARRY IS AN ERROR |
| 0111 | 00 | 68 | | NOP | |
| 0112 | 0311 | 69 | | ADD | A,#11H |
| 0114 | 97 | 70 | | CLR | C |
| 0115 | A8 | 71 | | MOV | R0,A |
| 0116 | FA | 72 | | MOV | A,R2 |
| 0117 | F226 | 73 | | JB7 | DIV |
| 0119 | F7 | 74 | | RLC | A |
| 011A | AA | 75 | | MOV | R2,A |
| 011B | F9 | 76 | | MOV | A,R1 |
| 011C | F7 | 77 | | RLC | A |
| 011D | F622 | 78 | | JC | INCC ; THIS CARRIES TO MSB OF QUOTIENT |
| | | 79 | | | |
| 011F | A9 | 80 | AR1: | MOV | R1,A |
| 0120 | 240B | 81 | | JMP | SHIFT |
| | | 82 ; | | | |
| 0122 | 1A | 83 | INCC: | INC | R2 |
| 0123 | 97 | 84 | | CLR | C |
| 0124 | 241F | 85 | | JMP | AR1 |
| | | 86 ; | | | |
| 0126 | FD | 87 | DIV: | MOV | A,R5 ; THE DIVISION ROUTINE |
| 0127 | 37 | 88 | | CPL | A |
| 0128 | 6A | 89 | | ADD | A,R2 |
| 0129 | 37 | 90 | | CPL | A |
| 012A | 7659 | 91 | | JF1 | CARRY |
| | | 92 ; | | | |
| 012C | E633 | 93 | R: | JNC | GTT |
| 012E | 97 | 94 | | CLR | C |
| 012F | 85 | 95 | | CPL | F0 |
| 0130 | 95 | 96 | | CPL | F0 |
| 0131 | 243D | 97 | | JMP | ANS |
| | | 98 ; | | | |
| 0133 | AD | 99 | GT: | MOV | R5,A |
| 0134 | FC | 100 | | MOV | A,R4 |
| 0135 | 37 | 101 | | CPL | A |
| 0136 | 69 | 102 | | ADD | A,R1 |
| 0137 | 37 | 103 | | CPL | A |
| 0138 | 363C | 104 | | JNC | OK |
| 013A | 97 | 105 | | CLR | C |
| 013B | CD | 106 | | DEC | R5 |
| | | 107 ; | | | |
| 013C | AC | 108 | OK: | MOV | R4,A |
| | | 109 ; | | | |
| 013D | FE | 110 | ANS: | MOV | A,R6 |
| 013E | F7 | 111 | | RLC | A |
| 013F | AE | 112 | | MOV | R6,A |
| 0140 | FF | 113 | | MOV | A,R7 |
| 0141 | F7 | 114 | | RLC | A |
| 0142 | F6A6 | 115 | | JC | TBEG |
| 0144 | B647 | 116 | | JF0 | Q |
| 0146 | 1E | 117 | | INC | R6 |
| | | 118 ; | | | |
| 0147 | AF | 119 | Q: | MOV | R7,A |
| 0148 | 85 | 120 | | CLR | F0 |
| 0149 | C8 | 121 | | DEC | R0 |
| 014A | F8 | 122 | | MOV | A,R0 |
| 014B | C65D | 123 | | JZ | DVDEND |
| 014D | FC | 124 | | MOV | A,R4 |

TABLE II-continued

| | | | | | |
|---|---|---|---|---|---|
| 014E | F7 | 125 | | RLC | A |
| 0L4F | AC | 126 | | MOV | R4,A |
| 0150 | FD | 127 | | MOV | A,R5 |
| 0151 | F7 | 128 | | RLC | A |
| 0152 | AD | 129 | | MOV | R5,A |
| 0153 | E626 | 130 | | JNC | DIV |
| 0155 | A5 | 131 | | CLR | F1 |
| 0156 | B5 | 132 | | CPL | F1 |
| 0157 | 2426 | 133 | | JMP | DIV |
| | | 134 ; | | | |
| 0159 | 97 | 135 | CARRY: | CLR | C |
| 015A | A5 | 136 | | CLR | F1 |
| 015B | 242C | 137 | | JMP | R |
| | | 138 ; | | | |
| 015D | B830 | 139 | DVDEND: | MOV | R0,#30H ; SET REGISTERS TO PERMIT BCD CONV. |
| 015F | FE | 140 | | MOV | A,R6 |
| 0160 | 28 | 141 | | XCH | A,R0 |
| 0161 | A9 | 142 | | MOV | R1,A |
| 0162 | 28 | 143 | | XCH | A,R0 |
| 0163 | BC03 | 144 | | MOV | R4,#03H |
| | | 145 ; | | | |
| 0165 | B100 | 146 | BCDCOA: | MOV | @R1,#00H ; BINARY TO BCD CONVERSION |
| 0167 | 19 | 147 | | INC | R1 |
| 0168 | EC65 | 148 | | DJNZ | R4,BCDCOA |
| 016A | BB10 | 149 | | MOV | R3,#10H |
| | | 150 ; | | | |
| 016C | 97 | 151 | BCDCOB: | CLR | C |
| 016D | F7 | 152 | | RLC | A |
| 016E | 2F | 153 | | XCH | A,R7 |
| 016F | F7 | 154 | | RLC | A |
| 0170 | 2F | 155 | | XCH | A,R7 |
| 0171 | 28 | 156 | | XCH | A,R0 |
| 0172 | A9 | 157 | | MOV | R1,A |
| 0173 | 28 | 158 | | XCH | A,R0 |
| 0174 | BC03 | 159 | | MOV | R4,#03H |
| 0176 | AD | 160 | | MOV | R5,A |
| | | 161 ; | | | |
| 0177 | F1 | 162 | BCDCOC: | MOV | A,@R1 |
| 0178 | 71 | 163 | | ADDC | A,@R1 |
| 0179 | 57 | 164 | | DA | A |
| 017A | A1 | 165 | | MOV | @RA,A |
| 017B | 19 | 166 | | INC | R1 |
| 017C | EC77 | 167 | | DJNZ | R4,BCDCOC |
| 017E | FD | 168 | | MOV | A,R5 |
| 017F | F6A6 | 169 | | JC | TBEG |
| 0181 | EB6C | 170 | | DJNZ | R3,BCDCOB |
| 0183 | 97 | 171 | | CLR | C |
| | | 172 ; | | | |
| 0184 | F0 | 173 | TANS: | MOV | A,@R0 ; TAKE BCD ANS AND PUT IN OUTPUT REGS |
| 0185 | 2C | 174 | | XCH | A,R4 ; R4 IS TWO LS DIGITS OF ANSWER |
| 0186 | 18 | 175 | | INC | R0 |
| 0187 | F0 | 176 | | MOV | A,@R0 |
| 0188 | 2D | 177 | | XCH | A,R5 ; R5 IS MS DIGIT OF ANSWER |
| 0189 | 043F | 178 | | JMP | OUTPUT |
| | | 179 ; | | | |
| 01A0 | | 180 | | ORG | 1A0H |
| 01A0 | B830 | 181 | TERR: | MOV | R0,#30H |
| 01A2 | 2484 | 182 | | JMP | TANS |
| | | 183 ; | | | |
| 01A6 | | 184 | | ORG | 1A6H |
| 11A6 | 043F | 185 | TBEG: | JMP | OUTPUT |
| | | 186 ; | | | |
| 0200 | | 187 | | ORG | 200H |
| 0200 | FC | 188 | DISPL: | MOV | A,R4 ; SUBROUTINE TO DISPLAY ANSWER |
| 0201 | 3E | 189 | | MOVD | P6,A |
| 0202 | 47 | 190 | | SWAP | A |
| 0203 | 3D | 191 | | MOVD | P5,A |
| 0204 | FD | 192 | | MOV | A,R5 |
| 0205 | 3C | 193 | | MOVD | P4,A |
| 0206 | 83 | 194 | | RET | |
| | | 195 ; | | | |
| 0210 | | 196 | | ORG | 210H |
| 0210 | BB61 | 197 | D1SEC: | MOV | R3,#61H; SUBROUTINE TO DELAY 1 SECOND |

TABLE II-continued

| 0212 | 23A7 | 198 |       | MOV  | A,#0A7H  |      |
|------|------|-----|-------|------|----------|------|
|      |      | 199 | ;     |      |          |      |
| 0214 | 00   | 200 | REP1: | NOP  |          |      |
| 0215 | 00   | 201 |       | NOP  |          |      |
| 0216 | 00   | 202 |       | NOP  |          |      |
| 0217 | 07   | 203 |       | DEC  | A        |      |
| 0218 | 9614 | 204 |       | JNZ  | REP1     |      |
| 021A | EB14 | 205 |       | DJNZ | R3,REP1  |      |
| 021C | 83   | 206 |       | RET  |          |      |
|      |      | 207 |       | END  |          |      |

USER SYMBOLS

| ANS    | 013D | AR1    | 011F | BCDCOA | 0165 | BCDCOB | 016C |
| COUNT2 | 0075 | COUNT3 | 0077 | D1SEC  | 0210 | DISPL  | 0200 |
| LAD1   | 0010 | LADJ   | 0100 | OK     | 013C | OUTPUT | 003F |
| TANS   | 0184 | TBEG   | 01A6 | TERR   | 01A0 | TURNON | 0034 |
| BCDCOC | 0177 | BEGIN  | 0030 | CARRY  | 0159 | COUNT1 | 0070 |
| DIV    | 0126 | DVDEND | 0150 | GTT    | 0133 | INCC   | 0122 |
| Q      | 0147 | R      | 012C | REP1   | 0214 | SHIFT  | 010R |
| WAIT   | 0050 |        |      |        |      |        |      |

What is claimed is:

1. A method for determining the rotational speed of a body, comprising the steps of:
   (a) disposing a sensible indicium for rotation with said body;
   (b) generating a succession of output signals, each corresponding with a passage of said indicium through a preselected location in the rotational path thereof;
   (c) initiating a count cycle upon the generation of a first such output signal and discontinuing said count cycle upon the generation of a second such output signal, said second output signal sequentially succeeding said first output signal;
   (d) determining body rotational speed from the count accumulated in said step (c); and
   (e) updating rotational speed determination by practice of the substeps of
   (e) (1) initiating a further count cycle upon the generation of a third such output signal succeeding but non-sequential to said second output signal and discontinuing said further count cycle upon the generation of a fourth such output signal, said fourth output signal sequentially succeeding said third output signal, and
   (e) (2) determining updated body rotational speed from the count accumulated in said step (e) (1).

2. The method claimed in claim 1 further including the further steps of establishing a predetermined time period following generation of said first output signal and discontinuing said count cycle if said second output signal is not generated within said time period.

3. The method claimed in claim 1 including the further steps of establishing a desired rotational speed for said body and providing output indication if such determined body speed does not correspond to such established speed.

4. The method claimed in claim 3 wherein said output indication is made selectively for determined body speeds over and under said established speed.

5. The method claimed in claim 2 including the further steps of establishing a desired rotational speed for said body and providing output indication if such determined body speed does not correspond to such established speed.

6. The method claimed in claim 5 wherein said output indication is made selectively for determined body speeds over and under said established speed.

7. A system for determining the rotational speed of a body having a sensible indicium rotatable therewith, comprising:
   (a) transducer means for sensing each revolution of said indicium and generating an output signal indicative of each such sensing;
   (b) selector means for receiving such output signals and responsive to a control signal for gating selective such received signals therethrough; (and)
   (c) processor means for receiving such gated signals and
   (1) generating (said) a first such control signal for effecting gating of a pair of said output signals through said selector means, one signal of said pair being sequentially successive to the other signal of said pair,
   (2) determining said body rotational speed from the difference in the times of occurrence of said one and said other of the signals of said pair;
   (3) generating a further such control signal for effecting gating of a further pair of said output signals through said selector means, one signal of said further pair being sequentially non-successive to the signals of said first-mentioned pair and the other signal of such further pair being sequentially successive to said one signal of said further pair; and
   (4) determining updated body rotational speed from the difference in the times of occurrence of said one and said other of the signals of said further pair.

8. The system claimed in claim 7 further including means for establishing a predetermined time period following generation of the first-occurring of said output signals of such gated pair and for discontinuing operation of said system if the other signal of said pair is not generated within said time period.

9. The system claimed in claim 7 further including indicator means for establishing a desired rotational speed for said body and providing output indication if such determined speed does not correspond to such established speed.

10. The system claimed in claim 9 wherein said indicator means provides output indication of whether said determined speed is over or under said established speed.

11. The system claimed in claim 8 further including indicator means for establishing a desired rotational speed for said body and providing output indication if such determined speed does not correspond to such established speed.

12. The system claimed in claim 11 wherein said indicator means provides output indication of whether said determined speed is over or under said established speed.

13. In combination, for determining the rotational speed of a body having a sensible indicium rotatable therewith, comprising:

(a) transducer means for sensing each revolution of said indicium and generating an output signal indicative of each such sensing;
(b) selector means for receiving each such means (a) output signal and responsive to a control signal for gating selective but not all of such received means (a) output signals therethrough;
(c) means for generating said control signals for such selective gating and for applying same to said means (b); and
(d) means for receiving such signals gated selectively through said means (b) for determining body rotational speed therefrom.

* * * * *